United States Patent
Fukuchi

(10) Patent No.: US 8,204,387 B2
(45) Date of Patent: Jun. 19, 2012

(54) OPTICAL MODULATOR AND OPTICAL COMMUNICATION SYSTEM

(75) Inventor: Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 247 days.

(21) Appl. No.: 12/682,367

(22) PCT Filed: Oct. 10, 2008

(86) PCT No.: PCT/JP2008/068415
§ 371 (c)(1),
(2), (4) Date: Apr. 27, 2010

(87) PCT Pub. No.: WO2009/048121
PCT Pub. Date: Apr. 16, 2009

(65) Prior Publication Data
US 2010/0215365 A1    Aug. 26, 2010

(30) Foreign Application Priority Data
Oct. 10, 2007    (JP) ................. 2007-264416

(51) Int. Cl.
*H04B 10/04* (2006.01)
(52) U.S. Cl. ..................... 398/201; 359/279
(58) Field of Classification Search ............ 398/45, 398/90–91, 201; 359/279
See application file for complete search history.

(56) References Cited

U.S. PATENT DOCUMENTS
7,974,542 B2 *    7/2011    Kagawa .................. 398/188

FOREIGN PATENT DOCUMENTS
| JP | 3-179939 A | 8/1991 |
|----|------------|--------|
| JP | 2760856 B | 3/1998 |
| JP | 2006339760 A | 12/2006 |

OTHER PUBLICATIONS

International Search Report for PCT/JP2008/068415 mailed Jan. 13, 2009.
K. Fukuchi, "Simulation study of a 6-level PSK modulation format signal generation method", The institute of Electronics, Information and Communication Engineers Sogo Taikai Koen Ronbunshu, Tsushin 2, Mar. 5, 2008, B-10-103, p. 386.
K. Fukuchi, "Proposal and feasibility study of a 6-level PSK modulation format based system", IEICE Technical Report, The Institute of Electronics, Informatino and Communication Engineers, vol. 108, No. 133, Jul. 10, 2008, pp. 19-23.
K. Fukuchi, "Proposal and feasibility study of a 6-level PSK modulation format based system for 100-Gb/s migration", OFC/NFOEC 2008, OMI6, 2008, pp. 1-3.

* cited by examiner

*Primary Examiner* — Leslie Pascal

(57) ABSTRACT

The optical modulator comprises an optical branching unit branching incident light into a first signal light and a second signal light; a first Mach-Zehnder modulator modulating the first signal light; a second Mach-Zehnder modulator modulating the second signal light; a phase shifter giving a fixed phase shift to the phase of the output light from the second Mach-Zehnder modulator; and an optical multiplexer multiplexing the output light from the first Mach-Zehnder modulator and the output light from the phase shifter. The phase shifter gives the phase shift so that the two input lights to the optical multiplexer have a phase difference of 60 degrees, and the first and second Mach-Zehnder modulators are driven by three-level signals.

7 Claims, 14 Drawing Sheets

FIG. 6

| INPUT BINARY BIT SEQUENCE | OUTPUT 1 | | OUTPUT 2 | | PHASE 1 | PHASE 2 |
|---|---|---|---|---|---|---|
| | FIRST SYMBOL | SECOND SYMBOL | FIRST SYMBOL | SECOND SYMBOL | | |
| 00000 | -1 | -1 | 0 | 0 | 0 | 0 |
| 00001 | -1 | 0 | 0 | -1 | 0 | 60 |
| 00010 | -1 | 1 | 0 | -1 | 0 | 120 |
| 00011 | -1 | 1 | 0 | 0 | 0 | 180 |
| 00100 | -1 | 0 | 0 | 1 | 0 | 240 |
| 00101 | -1 | -1 | 0 | 1 | 0 | 300 |
| 00110 | 0 | -1 | -1 | 0 | 60 | 0 |
| 00111 | 0 | 0 | -1 | -1 | 60 | 60 |
| 01000 | 0 | 1 | -1 | -1 | 60 | 120 |
| 01001 | 0 | 1 | -1 | 0 | 60 | 180 |
| 01010 | 0 | 0 | -1 | 1 | 60 | 240 |
| 01011 | 0 | -1 | -1 | 1 | 60 | 300 |
| 01100 | 1 | -1 | -1 | 0 | 120 | 0 |
| 01101 | 1 | 0 | -1 | -1 | 120 | 60 |
| 01110 | 1 | 1 | -1 | -1 | 120 | 120 |
| 01111 | 1 | 1 | -1 | 0 | 120 | 180 |
| 10000 | 1 | 0 | -1 | 1 | 120 | 240 |
| 10001 | 1 | -1 | -1 | 1 | 120 | 300 |
| 10010 | 1 | -1 | 0 | 0 | 180 | 0 |
| 10011 | 1 | 0 | 0 | -1 | 180 | 60 |
| 10100 | 1 | 1 | 0 | -1 | 180 | 120 |
| 10101 | 1 | 1 | 0 | 0 | 180 | 180 |
| 10110 | 1 | 0 | 0 | 1 | 180 | 240 |
| 10111 | 1 | -1 | 0 | 1 | 180 | 300 |
| 11000 | 0 | -1 | 1 | 0 | 240 | 0 |
| 11001 | 0 | 0 | 1 | -1 | 240 | 60 |
| 11010 | 0 | 1 | 1 | -1 | 240 | 120 |
| 11011 | 0 | 1 | 1 | 0 | 240 | 180 |
| 11100 | 0 | 0 | 1 | 1 | 240 | 240 |
| 11101 | 0 | -1 | 1 | 1 | 240 | 300 |
| 11110 | -1 | -1 | 1 | 0 | 300 | 0 |
| 11111 | -1 | 0 | 1 | -1 | 300 | 60 |
| AVERAGE LEVEL | 0.046875 | | -0.078125 | | | |

FIG. 7

| INPUT BINARY BIT SEQUENCE | OUTPUT 1 | | OUTPUT 2 | | PHASE 1 | PHASE 2 |
|---|---|---|---|---|---|---|
| | FIRST SYMBOL | SECOND SYMBOL | FIRST SYMBOL | SECOND SYMBOL | | |
| 00000 | -1 | -1 | 0 | 0 | 0 | 0 |
| 00001 | -1 | 0 | 0 | -1 | 0 | 60 |
| 00010 | -1 | 1 | 0 | -1 | 0 | 120 |
| 00011 | -1 | 1 | 0 | 0 | 0 | 180 |
| 00100 | -1 | 0 | 0 | 1 | 0 | 240 |
| 00101 | -1 | -1 | 0 | 1 | 0 | 300 |
| 00110 | 0 | -1 | -1 | 0 | 60 | 0 |
| 00111 | 0 | 0 | -1 | -1 | 60 | 60 |
| 01000 | 0 | 1 | -1 | -1 | 60 | 120 |
| 01001 | 0 | 1 | -1 | 0 | 60 | 180 |
| 01010 | 0 | 0 | -1 | 1 | 60 | 240 |
| 01011 | 0 | -1 | -1 | 1 | 60 | 300 |
| 01100 | -1 | 1 | 1 | -1 | 300 | 120 |
| 01101 | 1 | 0 | -1 | -1 | 120 | 60 |
| 01110 | -1 | 0 | 1 | 1 | 300 | 240 |
| 01111 | 1 | 1 | -1 | 0 | 120 | 180 |
| 10000 | 1 | 0 | -1 | 1 | 120 | 240 |
| 10001 | 1 | -1 | -1 | 1 | 120 | 300 |
| 10010 | 1 | -1 | 0 | 0 | 180 | 0 |
| 10011 | 1 | 0 | 0 | -1 | 180 | 60 |
| 10100 | 1 | 1 | 0 | -1 | 180 | 120 |
| 10101 | 1 | 1 | 0 | 0 | 180 | 180 |
| 10110 | 1 | 0 | 0 | 1 | 180 | 240 |
| 10111 | 1 | -1 | 0 | 1 | 180 | 300 |
| 11000 | 0 | -1 | 1 | 0 | 240 | 0 |
| 11001 | 0 | 0 | 1 | -1 | 240 | 60 |
| 11010 | 0 | 1 | 1 | -1 | 240 | 120 |
| 11011 | 0 | 1 | 1 | 0 | 240 | 180 |
| 11100 | 0 | 0 | 1 | 1 | 240 | 240 |
| 11101 | 0 | -1 | 1 | 1 | 240 | 300 |
| 11110 | -1 | -1 | 1 | 0 | 300 | 0 |
| 11111 | -1 | 0 | 1 | -1 | 300 | 60 |
| AVERAGE LEVEL | 0 | | 0 | | | |

FIG. 9

| INPUT BINARY BIT SEQUENCE | OUTPUT 1: PM-1 FIRST SYMBOL | OUTPUT 1: PM-1 SECOND SYMBOL | OUTPUT 2: AM-1 FIRST SYMBOL | OUTPUT 2: AM-1 SECOND SYMBOL | OUTPUT 3: PM-2 FIRST SYMBOL | OUTPUT 3: PM-2 SECOND SYMBOL | OUTPUT 4: AM-2 FIRST SYMBOL | OUTPUT 4: AM-2 SECOND SYMBOL | PHASE 1 | PHASE 2 |
|---|---|---|---|---|---|---|---|---|---|---|
| 00000 | -1 | -1 | 1 | 1 | * | * | 0 | 0 | 0 | 0 |
| 00001 | -1 | * | 1 | 0 | * | -1 | 0 | 1 | 0 | 60 |
| 00010 | -1 | 1 | 1 | 1 | * | -1 | 0 | 1 | 0 | 120 |
| 00011 | -1 | 1 | 1 | 1 | * | * | 0 | 0 | 0 | 180 |
| 00100 | -1 | * | 1 | 0 | * | 1 | 0 | 1 | 0 | 240 |
| 00101 | -1 | -1 | 1 | 1 | * | 1 | 0 | 1 | 0 | 300 |
| 00110 | * | -1 | 0 | 1 | -1 | * | 1 | 0 | 60 | 0 |
| 00111 | * | * | 0 | 0 | -1 | -1 | 1 | 1 | 60 | 60 |
| 01000 | * | 1 | 0 | 1 | -1 | -1 | 1 | 1 | 60 | 120 |
| 01001 | * | 1 | 0 | 1 | -1 | * | 1 | 0 | 60 | 180 |
| 01010 | * | * | 0 | 0 | -1 | 1 | 1 | 1 | 60 | 240 |
| 01011 | * | -1 | 0 | 1 | -1 | 1 | 1 | 1 | 60 | 300 |
| 01100 | 1 | -1 | 1 | 1 | -1 | * | 1 | 0 | 120 | 0 |
| 01101 | 1 | * | 1 | 0 | -1 | -1 | 1 | 1 | 120 | 60 |
| 01110 | 1 | 1 | 1 | 1 | -1 | -1 | 1 | 1 | 120 | 120 |
| 01111 | 1 | 1 | 1 | 1 | -1 | * | 1 | 0 | 120 | 180 |
| 10000 | 1 | * | 1 | 0 | -1 | 1 | 1 | 1 | 120 | 240 |
| 10001 | 1 | -1 | 1 | 1 | -1 | 1 | 1 | 1 | 120 | 300 |
| 10010 | 1 | -1 | 1 | 1 | * | * | 0 | 0 | 180 | 0 |
| 10011 | 1 | * | 1 | 0 | * | -1 | 0 | 1 | 180 | 60 |
| 10100 | 1 | 1 | 1 | 1 | * | -1 | 0 | 1 | 180 | 120 |
| 10101 | 1 | 1 | 1 | 1 | * | * | 0 | 0 | 180 | 180 |
| 10110 | 1 | * | 1 | 0 | * | 1 | 0 | 1 | 180 | 240 |
| 10111 | 1 | -1 | 1 | 1 | * | 1 | 0 | 1 | 180 | 300 |
| 11000 | * | -1 | 0 | 1 | 1 | * | 1 | 0 | 240 | 0 |
| 11001 | * | * | 0 | 0 | 1 | -1 | 1 | 1 | 240 | 60 |
| 11010 | * | 1 | 0 | 1 | 1 | -1 | 1 | 1 | 240 | 120 |
| 11011 | * | 1 | 0 | 1 | 1 | * | 1 | 0 | 240 | 180 |
| 11100 | * | * | 0 | 0 | 1 | 1 | 1 | 1 | 240 | 240 |
| 11101 | * | -1 | 0 | 1 | 1 | 1 | 1 | 1 | 240 | 300 |
| 11110 | -1 | -1 | 1 | 1 | 1 | * | 1 | 0 | 300 | 0 |
| 11111 | -1 | * | 1 | 0 | 1 | -1 | 1 | 1 | 300 | 60 |

OPTICAL MODULATOR AND OPTICAL COMMUNICATION SYSTEM

The present invention the National Phase of PCT/JP2008/068415, filed Oct. 10, 2008, which claims the benefit of Japanese Patent Application No. 2007-264416, filed on Oct. 10, 2007, the entire disclosure of which is incorporated by reference herein.

TECHNICAL FIELD

The present invention relates to an optical modulator efficiently generating multi-level modulated signal light, particularly six-level phase-modulated light, for optical transfer of a large volume of signals and an optical communication system having the optical modulator.

BACKGROUND ART

Optical fiber communication systems advantageously allow for efficient transmission of a large volume of information. There are two reasons that optical fiber communication systems allow for efficient information transfer. The first reason is that the low loss characteristic of optical fibers as transfer media causes little attenuation loss of signals during the transfer. Consequently, devices such as repeaters or generators necessary for long-distance transfer can advantageously be eliminated. The second reason is that hardware necessary for transmission/reception of optical signals can be cut down by time division multiplexing. Consequently, the cost necessary for transfer of the same volume can advantageously be reduced. The second reason is particularly useful for increased communication volume due to extensive use of the Internet. For example, some commercial optical fiber communication systems transfer 10 Gb/s per wavelength. Recently, some optical fiber communication systems have started to transfer 40 Gb/s per wavelength.

In order to deal with a larger volume of information communication in the future, ultrahigh-speed signal light transfer technology capable of multiplexing more signals is demanded. In response to such demand, intensive development and research has been conducted on technologies relating to signal transfer in a speed class of 100 Gb/s (approximately 100 Gb/s) or higher.

The NRZ (non-return-to-zero) code of which signals are easy to generate and detect is extensively used in optical fiber communication systems up to 10 Gb/s per wavelength. In an NRZ system, binary signals are encoded to optical ON and OFF for transfer.

Ultrahigh-speed transfer in an NRZ system has two major problems. The first problem is deterioration in waveform due to the dispersion of optical fibers have. Waveform distortion due to chromatic dispersion or polarization mode dispersion of optical fibers becomes more serious as the signal speed increases. Such waveform distortion due to chromatic dispersion or polarization mode dispersion restricts the transmission distance of an optical communication system. More specifically, the transmission distance restricted by chromatic dispersion is shortened in inverse proportion to the square of the increase in signal speed. Meanwhile, the possible transmission distance restricted by polarization mode dispersion is shortened in inverse proportion to the signal speed.

The second problem is the operational speed limit of electronic signal multiplexing circuits. For example, a 100 GHz band class electronic circuit, namely an electronic circuit capable of normal operation at a signal frequency of approximately 100 GHz is required for signal transfer at 100 Gb/s. However, it is difficult to realize such a circuit using highly economical silicon CMOS in current technology. To do so, electronic device techniques using InP materials are necessary. Even if some electronic device techniques using InP materials are applicable, various technical problems have to be overcome for stable operation because the 100 GHz class operation speed is nearly the operation speed limit of the device.

Besides the approach to increasing the operation speed of the electronic circuit for realizing ultrahigh-speed transfer, multi-level optical modulation techniques have drawn attention. Multi-level modulation is a modulation technique to assign multiple-bit information to three or more optical states. For example, the differential quadrature phase shift keying (DQPSK) has drawn attention as an important technique for 40 Gb/s optical transfer. In the DQPSK, 2-bit digital values (00, 01, 10, and 11) are assigned to four states or optical phases 0°, 90°, 180°, and 270° ("symbols" hereinafter). In this system, two bits are transferred by a symbol. Then, the symbol rate is half the bit rate. Consequently, an electronic circuit processing the symbols requires a band that is approximately half the bit rate. For example, a symbol rate of 50 G symbols/s is necessary for transferring signals at 100 Gb/s by the DQPSK.

Advantageously, an electronic circuit, such as a multiplexer and modulator driver, processing signals at 50 G symbols/s requires a band approximately up to 50 GHz. The symbol rate is lower than the bit rate; therefore, the time slot for one symbol is double the bit time slot. Consequently, waveform distortion due to dispersion is less influential and the transmission distance, which is restricted by dispersion, can advantageously be increased compared with binary modulation such as the NRZ. Using the above advantages, techniques for generating, transferring, and detecting DQPSK signal light have been under development.

Background technology relating to DQPSK signal generation is described hereinafter with reference to FIG. 11. FIG. 11 is a block diagram showing the quadrature phase shift keying unit described in FIG. 3 of Patent Literature 1. In the quadrature phase shift keying unit shown in FIG. 11, light entering an entrance end 1110 is branched into two signal lights of an equal light amount. One signal light is subject to binary, 0 or π phase, modulation in a first phase modulator 1111. The other signal light is also subject to binary, 0 or π phase, modulation in a second phase modulator 1112. After the binary modulation, a π/2 phase shift is given by a phase shifter 1113. The two phase-modulated lights are multiplexed and output from an output end 1114.

FIG. 12 presents a plane of complex coordinates showing the phases of phase-modulated lights in the quadrature phase shift keying unit shown in FIG. 11. The phase modulation effected by the first phase modulator 1111 shown in FIG. 11 is presented by phase modulation (a signal light state) 1211 in FIG. 12. Taking into account the π/2 phase shift given by the phase shifter 1113, the phase modulation effected by the second phase modulator 1112 shown in FIG. 11 is presented by phase modulation 1212 in FIG. 12. These modulated lights are multiplexed to generate a modulated light having four phase states 1213.

As described, for example, in Patent Literature 2, Mach-Zehnder modulators (Mach-Zehnder optical modulators) can be used as the two phase modulators 1111 and 1112 shown in FIG. 11 so as to more easily and precisely perform binary phase shift keying Mach-Zehnder optical modulators are often included in configurations for generating DQPSK signals.

Some methods include four-level intensity modulation in addition to the DQPSK to generate 16-level modulated signal light (for example, see Patent Literature 3). FIG. 13 is a block diagram showing the multi-level modulated signal generation part of the optical communication system described in FIG. 11 of Patent Literature 3. In the configuration shown in FIG. 13, CW (clockwise) light output from a light source 1310 is 0- or π-modulated in a first phase modulator 1311 and 0- or π/2-modulated in a second phase modulator 1312, whereby DQPSK signal light is generated by the two phase modulators 1311 and 1312. Then, the light is subject to intensity modulation in an intensity modulator 1313 driven by four-level signals. The combination of four-level phase modulation (DQPSK) and four-level intensity modulation through the process in the phase modulator 1311 and 1312 and intensity modulator 1313 yields 16-level modulated signal light. With four-level intensity modulation in addition to the DQPSK, the symbol rate is ¼ of the bit rate. Then, advantageously, for example, necessary processing speed of the symbol is only a 10 GHz class for transferring signals at 40 Gb/s. Compared with signal transfer using the DQPSK, the restricted transmission distance by polarization mode dispersion is expected to be less. In other words, the transmission distance is expected to be extended. Incidentally, the configuration shown in FIG. 11 can be used for generating DQPSK signal light.

Patent Literature 1: Unexamined Japanese Patent Application KOKAI Publication No. H3-179939 (page 17 and FIG. 3);
Patent Literature 2: Patent Publication No. 2760856 (page 3 and FIG. 1); and
Patent Literature 3: Unexamined Japanese Patent Application KOKAI Publication No. 2006-339760 (paragraphs 0092-0095 and FIG. 11).

DISCLOSURE OF INVENTION

The above described background technologies have the following problems. The first problem is that components used for modulation must have highly linear characteristics as the number of states in multi-level modulation (for example, 16 in 16-level modulation; "the number of values" hereinafter) is increased. For example, in the generation method of 16-level modulated signal light in the configuration shown in FIG. 13, the intensity modulation unit 1313 has to generate four-level output signal light for each input of four-level signal light. For example, a Mach-Zehnder optical modulator has a nonlinear relationship between the input signal voltage and output light intensity. When a Mach-Zehnder optical modulator is used as the intensity modulation unit 1313, inverse characteristics has to be added to the input signal light in advance so that the output light becomes four-level intensity-modulated signal light at equal intervals. However, as is generally known, it is difficult to generate and amplify several tens Gb/s class signals with high accuracy for acquiring output lights at equal intervals.

The second problem is that the circuit for generating multi-level modulated signals has a more complex configuration as the number of values is increased. For example, to generate the 16-level modulated signal light in the configuration shown in FIG. 13, signals have to be given to two parts, the phase modulation units 1311 and 1312 and the intensity modulation unit 1313 and therefore the number of components is increased. An optical modulator using a smaller number of components for realizing a multi-level modulation system is a vector optical modulator. A vector optical modulator uses Mach-Zehnder optical modulators as the phase modulation units 1311 and 1312 to generate the DQPSK signal light in the configuration shown in FIG. 11. The two Mach-Zehnder optical modulators are used not only for phase modulation but also for intensity modulation so as to generate optical states of arbitrary intensity and in arbitrary phase. However, in such a case, electric signals applied to the Mach-Zehnder optical modulators are not binary signals but signals having analog signal waveforms. Then, the first problem that the components must have highly linear characteristics occurs.

If the number of values is set to a low number such as 4 in order to prevent the above first and second problems that the configuration of the circuit becomes complex in configuration and the circuit components must have highly linear characteristics, it is difficult to achieve the initial purpose of reducing the symbol processing speed of an electronic circuit for realizing ultrahigh-speed transfer. Hence, the third problem is that it is difficult to achieve the initial purpose of reducing the symbol processing speed.

The focus of future researches and development will be on signals at 100 Gb/s, which exceeds 40 Gb/s signals currently examined for introduction. On the premise that electronic circuit technique for a 40 GHz band class to deal with 40 Gb/s signal light is used, the symbol rate will be 50 G symbols/s for 100 Gb/s transfer when the number of values is as low as 4, which means that circuit technique for a higher speed is necessary. When the number of values is 8, one symbol transfers three bits. The symbol rate can be reduced to 33 G symbols/s. In such a case, circuit techniques for 40 GHz class are applicable. However, the configuration of the modulation system to generate the eight-level signal light becomes complex.

For example, in order to generate eight-level phase-modulated signal light in a vector optical modulator, four-level drive signals are necessary for optical vector signals generated by two Mach-Zehnder optical modulators to have eight values, as shown in complex coordinates of FIG. 4. In FIG. 14, the arrows depict phase modulations given by a vector optical modulator (mare specifically signal optical states). FIG. 14 also shows eight phase states (signal points of 8 phase shift keying signal light) 1411 generated by multiplexing them.

With regard to the third problem, the number of values is $2^n$ in most multi-level optical modulation systems for optimizing reduction in the symbol processing speed while suppressing the necessary operation speed of the electronic circuit and preventing the configuration of the modulation system from becoming complex. This is because when the number of values is $2^n$, it is easy to configure a digital electronic circuit for generating multi-level signals or processing symbols after reception. Then, if the transfer speed does not conform to speed multiplication by a factor of $2^n$ and a circuit configuration for realizing the lowest multiple number of $2^n$ of values is used to realize the transfer speed, the number of values is increased more than necessary, making the system complex. For example, 40 GHz conforms to speed multiplication by a factor of $2^n$ from 10 GHz while 100 GHz does not conform to speed multiplication by a factor of $2^n$ from 40 GHz.

The purpose of the present invention is provide an optical modulator and optical communication system in which when the transfer speed does not conform to speed multiplication by a factor of $2^n$, the possible lowest number of values is used so as to overcome the problems with an electronic circuit such as complexity and liner characteristics and the configuration of the electronic circuit is optimized so as to have a symbol processing speed nearly equal to existing systems, whereby the transfer volume limit imposed by restricted circuit speeds is eased, and multi-level phase-modulated optical signals are efficiently generated.

The first aspect of the present invention provides an optical modulator comprising an optical branching unit branching incident light into a first signal light and a second signal light; a first Mach-Zehnder modulator modulating the first signal light; a second Mach-Zehnder modulator modulating the second signal light; a phase shifter giving a fixed phase shift to the phase of the output light from the second Mach-Zehnder modulator; and an optical multiplexer multiplexing the output light from the first Mach-Zehnder modulator and the output light from the phase shifter, in which the phase shifter gives the phase shift so that the two input lights to the optical multiplexer have a phase difference of 60 degrees, and the first and second Mach-Zehnder modulators are driven by three-level signals.

The second aspect of the present invention provides an optical modulator comprising an optical branching unit branching incident light into a first signal light and a second signal light; a first phase modulator modulating the first signal light; a second phase modulator modulating the second signal light; a first intensity modulator modulating the intensity of the output light from the first phase modulator; a second intensity modulator modulating the intensity of the output light from the second phase modulator; a phase shifter giving a fixed phase shift to the phase of the output light from the second intensity modulator; and an optical multiplexer multiplexing the output light from the first intensity modulator and the output light from the phase shifter, in which the phase shifter gives the phase shift so that the two input lights to the optical multiplexer have a phase difference of 60 degrees, and the first and second phase modulators and the first and second intensity modulators are driven by binary signals.

The third aspect of the present invention provides an optical communication system comprising an encoder circuit transforming input data to two series of three-level signals and outputting them; an optical branching unit branching incident light into a first signal light and a second signal light; a first Mach-Zehnder modulator modulating the first signal light; a second Mach-Zehnder modulator modulating the second signal light; a phase shifter giving a fixed phase shift to the phase of the output light from the second Mach-Zehnder modulator; an optical multiplexer multiplexing the output light from the first Mach-Zehnder modulator and the output light from the phase shifter; a reception means for receiving the output light from the optical multiplexer and performing coherent reception with a local light; a phase detection means for detecting the optical phase of the output signal light from the reception means; and a decoder circuit outputting binary data based on the output from the phase detection means, in which the phase shifter gives the phase shift so that the two input lights to the optical multiplexer have a phase difference of 60 degrees, and the first and second Mach-Zehnder modulators are driven by three-level signals output from the encoder circuit.

The fourth aspect of the present invention provides an optical communication system comprising an encoder circuit transforming input data to four series of binary signals and outputting them; an optical branching unit branching incident light into a first signal light and a second signal light; a first phase modulator modulating the first signal light; a second phase modulator modulating the second signal light; a first intensity modulator modulating the intensity of the output light from the first phase modulator; a second intensity modulator modulating the intensity of the output light from the second phase modulator; a phase shifter giving a fixed phase shift to the phase of the output light from the second intensity modulator; an optical multiplexer multiplexing the output light from the first intensity modulator and the output light from the phase shifter; a reception means for receiving the output light from the optical multiplexer and performing coherent reception with a local light: a phase detection means for detecting the phase of the output light from the reception means; and a decoder circuit outputting binary data based on the output from the phase detection means, in which the phase shifter gives the phase shift so that the two input lights to the optical multiplexer have a phase difference of 60 degrees, and the first and second phase modulators and first and second intensity modulators are driven by binary signals output from the encoder circuit.

In the optical modulator and optical communication system of the present invention, when the transfer speed does not conform to speed multiplication by a factor of $2^n$, the possible lowest number of values is used so as to overcome the problems with an electronic circuit such as complexity and liner characteristics and the electronic circuit configuration is optimized so as to have a symbol processing speed nearly equal to existing systems, and therefore the transfer volume limit imposed by restricted circuit speeds is eased.

The above and other purpose, characteristics, and benefits of the present invention will be apparent from the explanation below with reference to the drawings.

BRIEF DESCRIPTION OF DRAWINGS

FIG. 6 is a table showing encoder output signals and generated phases in accordance with input signal bit sequences;

FIG. 7 is a table showing encoder output signals and generated phases in accordance with input signal bit sequences when the average encoder output is 0;

FIG. 9 is a table showing encoder output signals and generated phases in accordance with input signal bit sequences in Embodiment 3;

BEST MODE FOR CARRYING OUT THE INVENTION

Embodiments of the present invention will be described hereinafter with reference to the drawings. The same components are referred to by the same reference numbers in the figures.

Embodiment 1

Figure 1:
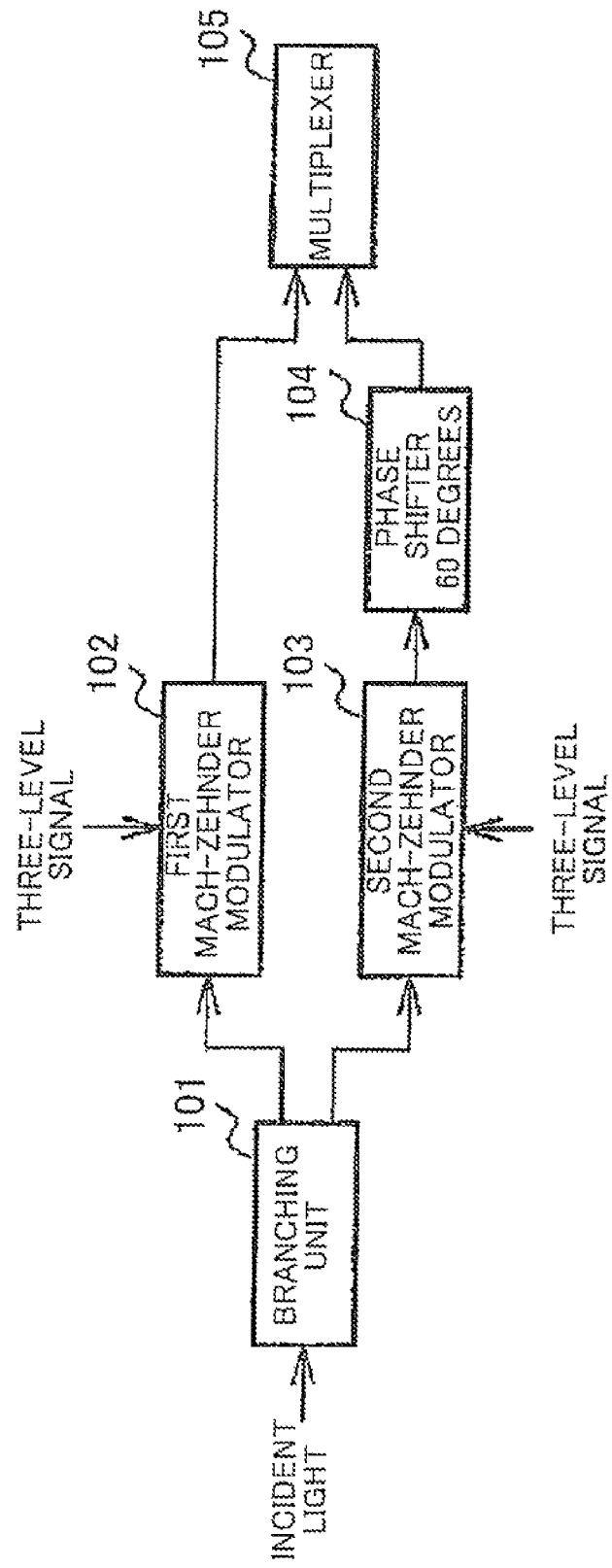
FIG. 1 is a block diagram of the optical modulator according to Embodiment 1 of the present invention.

FIG. 1 is a block diagram showing the configuration of an optical modulator according to Embodiment 1 of the present invention. The optical modulator of this embodiment comprises an optical branching unit 101 branching incident light into two lights, a first Mach-Zehnder modulator 102 modulating the first light branched by the optical branching unit 101, a second Mach-Zehnder modulator 103 modulating the second light branched by the optical branching unit 101, a phase shifter 104 connected to the second Mach-Zehnder modulator 103 and giving a fixed phase shift or a fixed shift rate to the optical phase, and an optical multiplexer 105 multiplexing the output light from the first Mach-Zehnder modulator 102 and the output light from the phase shifter 104. The phase shifter 104 gives a phase shift to the incident light so that the two lights entering the optical multiplexer 105 have a phase difference of 60 degrees. The first and second Mach-Zehnder modulators 102 and 103 are driven by three-level signals.

The optical modulator of this embodiment generates six-level phase-modulated signal light. Six-level phase modulation allows for transfer of signals in six states by one symbol. Furthermore, it allows for transfer of signals in 36 states by two symbols. In other words, up to 5 bits ($2^5$=32) are contained in two symbols. Therefore, multi-level signal transfer at 2.5 bits/symbol is realized. Hence, a symbol rate of 40 Gb/s suffices for signal transfer at 100 Gb/s. Consequently, the electronic circuit requires a smaller band compared with that for DQPSK.

Figure 2:
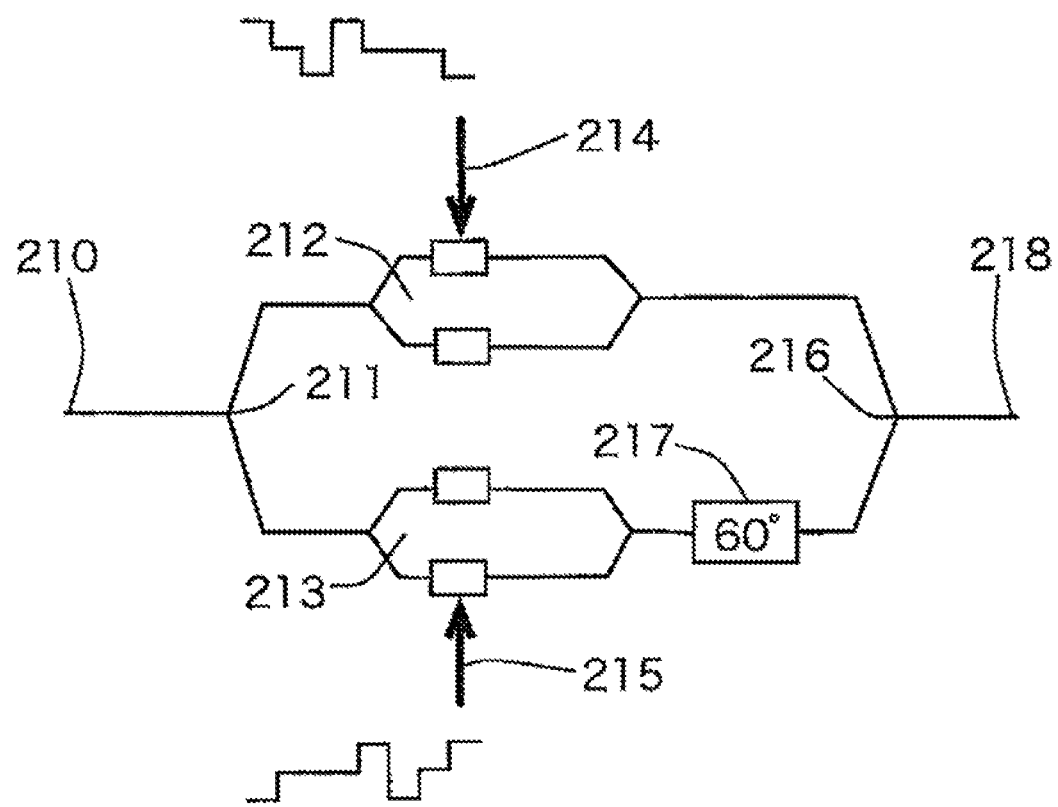
FIG. 2 is a block diagram of a specific vector modulator according to Embodiment 1.
Figure 3:
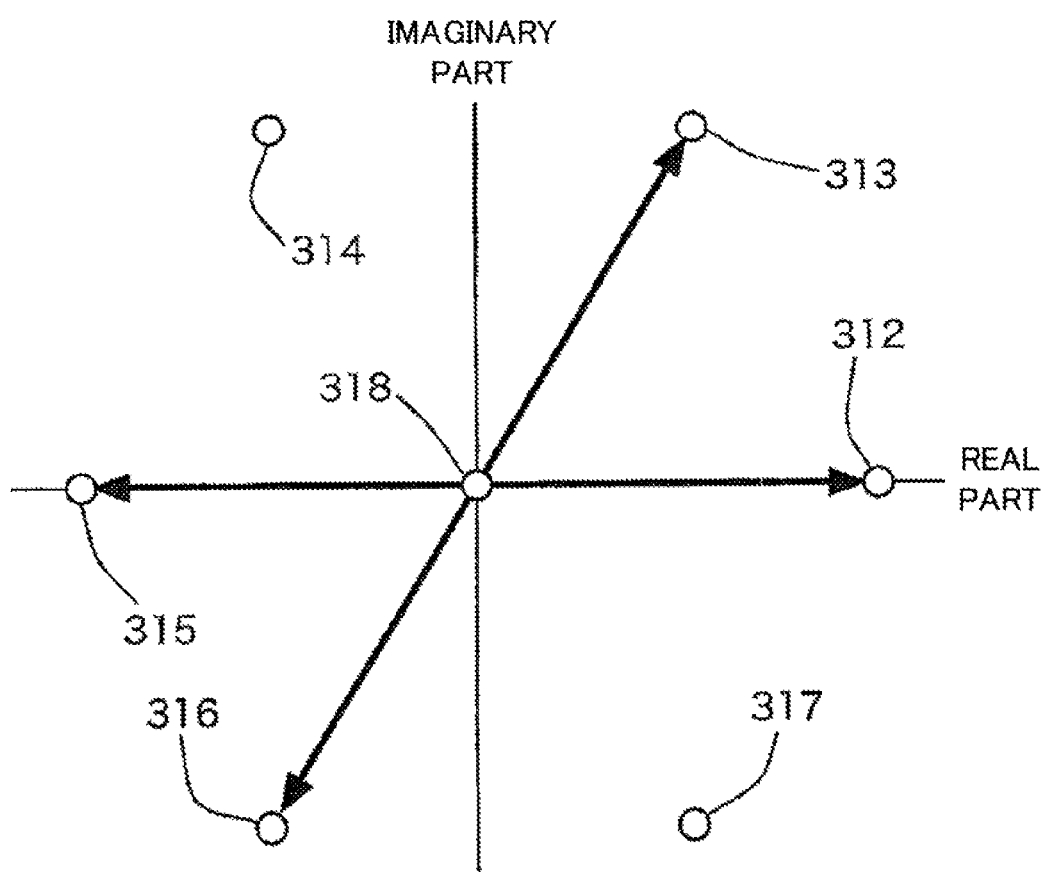
FIG. 3 presents a plane of complex coordinates showing the phases of six-level phase-modulated light.

FIG. 2 is a block diagram of a specific example according to this embodiment, showing the configuration of a vector modulator generating six-level phase-modulated signals. FIG. 3 presents a plane of complex coordinates showing the phases of six-level phase-modulated light.

The modulators of this embodiment are the aforementioned vector modulators. In the configuration shown in FIG. 2, light entering from an entrance end 210 is branched into a first signal light and a second signal light by an optical branching unit 211. The first signal light enters a first Mach-Zehnder modulator 212 and the second signal light enters a second, Mach-Zehnder modulator 213. Driven by three-level signals 214, the first Mach-Zehnder modulator 212 modulates the first signal light. Driven by three-level signals 215, the second Mach-Zehnder modulator 213 modulates the second signal light. A phase shifter 217 gives a phase shift of 60 degrees to the output light from the second Mach-Zehnder modulator.

Figure 4:
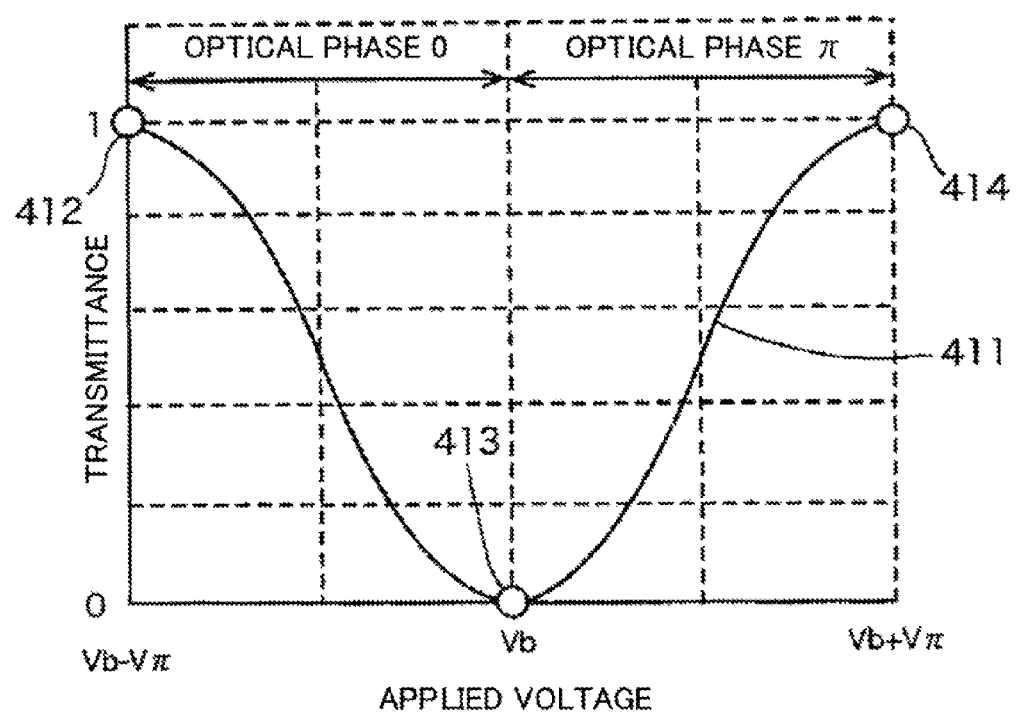
FIG. 4 is a graph showing the dependency of transmittance on applied voltage of a Mach-Zehnder modulator.

FIG. 4 is a graph for explaining the transmittance 411 of the output light with respect to the applied voltage of a Mach-Zehnder modulator at which generated chirp (additional phase modulation) in association with intensity modulation is zero. In FIG. 4, Vb is the bias voltage of the Mach-Zehnder modulator and Vπ is a half-wavelength voltage of the Mach-Zehnder modulator. In FIG. 4, a signal point 413 indicates that the light is quenched when the input voltage (applied voltage) is Vb. A signal point 412 indicates that the light is emitted in an optical phase of 0 when the voltage is Vb−Vπ. A signal point 414 indicates that the light is emitted in an optical phase of π when the voltage is Vb+Vπ. With the drive signals entering the Mach-Zehnder modulators 212 and 213 having three voltage levels indicated by the signal points 412, 413, and 414, the electric field of the output light from the first Mach-Zehnder modulator 212 will have three states on a plane of complex coordinates shown in FIG. 3: emission in a phase of 0° (the state at a signal point 312), emission in a phase of 180° (the state at a signal point 315), and quenching (the state at a signal point 318). On the other hand, the electric field of the output light from the phase shifter 217 will be switched among three states: emission in a phase of 60° (the state at a signal point 313), emission in a phase of 240° (the state at a signal point 316), and quenching (the state at a signal point 318).

After the output lights from the first Mach-Zehnder modulator 212 and phase shifter 217 are multiplexed by an optical multiplexer 216, the following six-level phase-modulated output is supplied at an output end 218.

Six-level phase-modulated output:

a first optically modulated output having an optical phase of 0° (signal point 312) as a result of receiving the emission in a phase of 0° from the first Mach-Zehnder modulator 212 (signal point 312) and the quenching from the phase shifter 217 (signal point 318);

a second optically modulated output having an optical phase of 60° (signal point 313) as a result of receiving the quenching from the first Mach-Zehnder modulator 212 (signal point 318) and the emission in a phase of 60° from the phase shifter 217 (signal point 313);

a third optically modulated output having an optical phase of 120° (signal point 314) as a result of receiving the emission in a phase of 180° from the first Mach-Zehnder modulator 212 (signal point 315) and the emission in a phase of 60° from the phase shifter 217 (signal point 313);

a fourth optically modulated output having an optical phase of 180° (signal point 315) as a result of receiving the emission in a phase of 180° from the first Mach-Zehnder modulator 212 (signal point 315) and the quenching from the phase shifter 217 (signal point 318);

a fifth optically modulated output having an optical phase of 240° (signal point 316) as a result of receiving the quenching from the first Mach-Zehnder modulator 212 (signal point 318) and the emission in a phase of 240° from the phase shifter 217 (signal point 316); and a sixth optically modulated output having an optical phase of 300° (signal point 317) as a result of receiving the emission in a phase of 0° from the first Mach-Zehnder modulator 212 (signal point 312) and the emission in a phase of 240° from the phase shifter 217 (signal point 316).

It is easily understood that in the above modulated output, the light intensity is equal among the outputs in the optical phases of 0°, 60°, 180°, and 240° where only one of the branched lights is output. Furthermore, it is understood from the composition of vectors in FIG. 3 that the light intensity of the outputs in the optical phases of 120° and 300° in which lights from the two modulators are multiplexed is equal to that of the outputs in the other optical phases. Using the above behavior, six-level phase-modulated light can be obtained.

Embodiment 2

Figure 5:
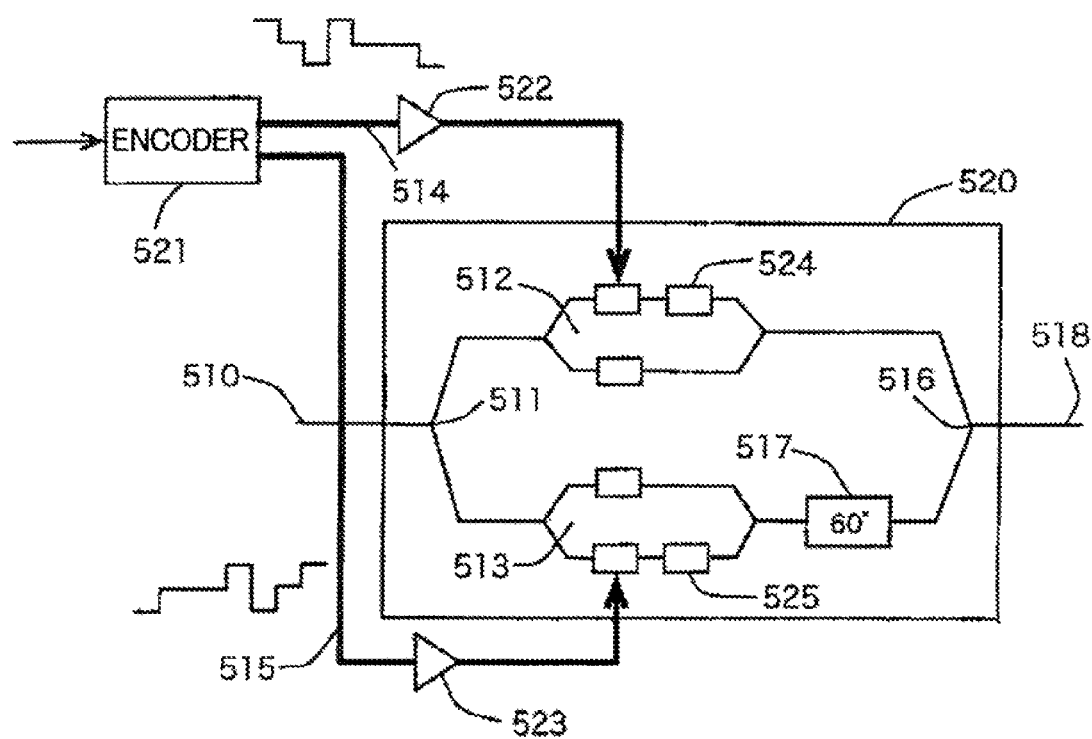
FIG. 5 is a block diagram of the optical modulator according to Embodiment 2 of the present invention.

FIG. 5 is a block diagram of the optical modulator according to Embodiment 2 of the present invention. The optical modulator is formed on a lithium niobate (LiNbO$_3$) crystal substrate (lithium niobate substrate) 520. In FIG. 5, light entering from an incident fiber 510 is coupled to a waveguide of the lithium niobate substrate 520 and branched into a first signal light and a second signal light by a Y-branching circuit (optical branching unit) 511. The branching ratio is 1:1. One output of the optical branching unit 511 is connected to the input of a first Mach-Zehnder modulator 512. The first Mach-Zehnder modulator 512 modulates the input light. The other output of the optical branching unit 511 is connected to the input of a second Mach-Zehnder modulator 513. The second Mach-Zehnder modulator 513 modulates the input light. The output of the second Mach-Zehnder modulator 513 is connected to a phase shifter 517. A static voltage is applied to the phase shifter 517 so that the optical phase of the incident light is shifted by 60°. The output of the first Mach-Zehnder modulator 512 and the output of the phase shifter 517 are connected to two inputs of an optical multiplexer 516 on the lithium niobate substrate 520, respectively. The optical multiplexer 516 multiplexes two input lights. The output of the optical multiplexer 516 is coupled to an output fiber 518 via a waveguide of the lithium niobate substrate 520 and output to the output fiber 518.

An encoder 521 receives 5-bit binary signals (input data) and outputs three-level signals, −1, 0, and 1, in two symbols, to each of the two series of output. FIG. 6 is a table showing output signals from the encoder 521 and generated phases in accordance with bit sequences of the input signal. In FIG. 6, "Output 1" is a first output 514 given to the first Mach-Zehnder modulator 512 from the encoder 521 and "Output 2" is a second output 515 given to the second Mach-Zehnder modulator 513 from the encoder 521.

The first output 514 of the encoder 521 is connected to the input of a driver amplifier 522. The driver amplifier 522 amplifies the input signal. The output of the driver amplifier 522 is connected to the first Mach-Zehnder modulator 512 to drive it. Similarly, the second output 515 of the encoder 521 is connected to the input of a driver amplifier 523. The driver amplifier 523 amplifies the input signal. The output of the driver amplifier 523 is connected to the second Mach-Zehnder modulator 513 to drive it.

The first Mach-Zehnder modulator 512 comprises a DC bias port 524 and the second Mach-Zehnder modulator 513 comprises a DC bias port 525. A proper voltage that leads to the quenching when the input voltage from the driver amplifier 522 is 0 is applied to the DC bias port 524. A proper voltage that leads to the quenching when the input voltage from the driver amplifier 523 is 0 is applied to the DC bias port 525.

The behavior of the optical modulator shown in FIG. 5 will be described hereinafter. Light entering from an incident fiber 510 is divided into two lights with the same amount by the optical branching unit 511. The first signal light is modulated by the first Mach-Zehnder modulator 512. The first Mach-Zehnder modulator 512 receives a drive signal supplied from the encoder 521 and amplified by the driver amplifier 522 to make a peak-to-peak amplitude $2V\pi$. The drive signal has three voltage levels, $-V\pi$, 0, and $V\pi$. A voltage that leads to the quenching when the drive signal is 0 (the voltage Vb in FIG. 4) is applied to the DC bias port 524. Consequently, the first Mach-Zehnder modulator 512 yields signal light making transitions among three states, emission in a phase of 0, quenching, and emission in a phase of it. Similarly, the second Mach-Zehnder modulator 513 yields signal light making transitions among the three states.

The phase shifter 517 gives a fixed phase shift to the output of the second Mach-Zehnder modulator 513. A voltage applied to the phase shifter 517 for shifting the phase is optimized so that the output light from the first Mach-Zehnder modulator 512 and the output light from the phase shifter 517 have a phase difference of 60° when they are multiplexed by the optical multiplexer 516. For example, when the two optical paths between the optical branching unit 511 and optical multiplexer 516 are equal in length, the voltage to be applied is $V\pi/3$. Six-level PSK signals are obtained in this multiplexing. "Phase 1" and "Phase 2" shown in FIG. 6 are generated in accordance with bit sequences of the input signal. As described above, six-level phase-modulated signals are generated.

The phase difference created by an voltage the phase shifter 517 applies and necessary for the optical multiplexer 516 is not restricted to 60° and can be any one of 120°, 240°, and 300°. This is because the absolute value of individual phase differences does not matter as long as the output signals from the two modulators have a relative phase difference of 60° (+60° or −60°).

In Embodiment 2 shown in FIG. 5, five bits ($2^5=32$) are contained in two symbols (36 states) for transfer of 5-bit (32-state) six-level phase-modulated light. As just described, the number of signal light states (36 states) is larger than the number of states to be transferred (32 states), creating some degree of freedom in mapping of 5-bit data to the signal light states.

Signals for driving the first and second Mach-Zehnder modulators 512 and 513 are high speed signals. Therefore, AC coupling amplifiers are generally used as the driver amplifiers 522 and 523. In amplification by an AC coupling driver amplifier, the average signal level may causes the input level "0" to lead to an output level deviated from "0" and having a value varied according to the amplification factor. For example, in encoding shown in the truth table of FIG. 6, the average values of symbols applied to the first and second Mach-Zehnder modulators 512 and 513 are approximately 0.046875 and −0.078125, respectively, and the output level may possibly deviate from the input level.

In order to eliminate the above possible deviation, the degree of freedom in mapping to the states allows the change of the assignment to make the average symbol value 0. More specifically, the assignment shown in FIG. 7 is used. In the assignment shown in FIG. 7, the average value of symbols assigned to 5-bit (32-state) data is 0. The symbols assigned to 5-bit data are supplied to the first and second Mach-Zehnder modulators 512 and 513 in sequence and the time average value of three-level signals is 0. Consequently, the input level "0" leads to the output level "0" even if AC coupling driver modulators are used. The operation is stabilized regardless of the amplification factor.

Embodiment 3

Figure 8:
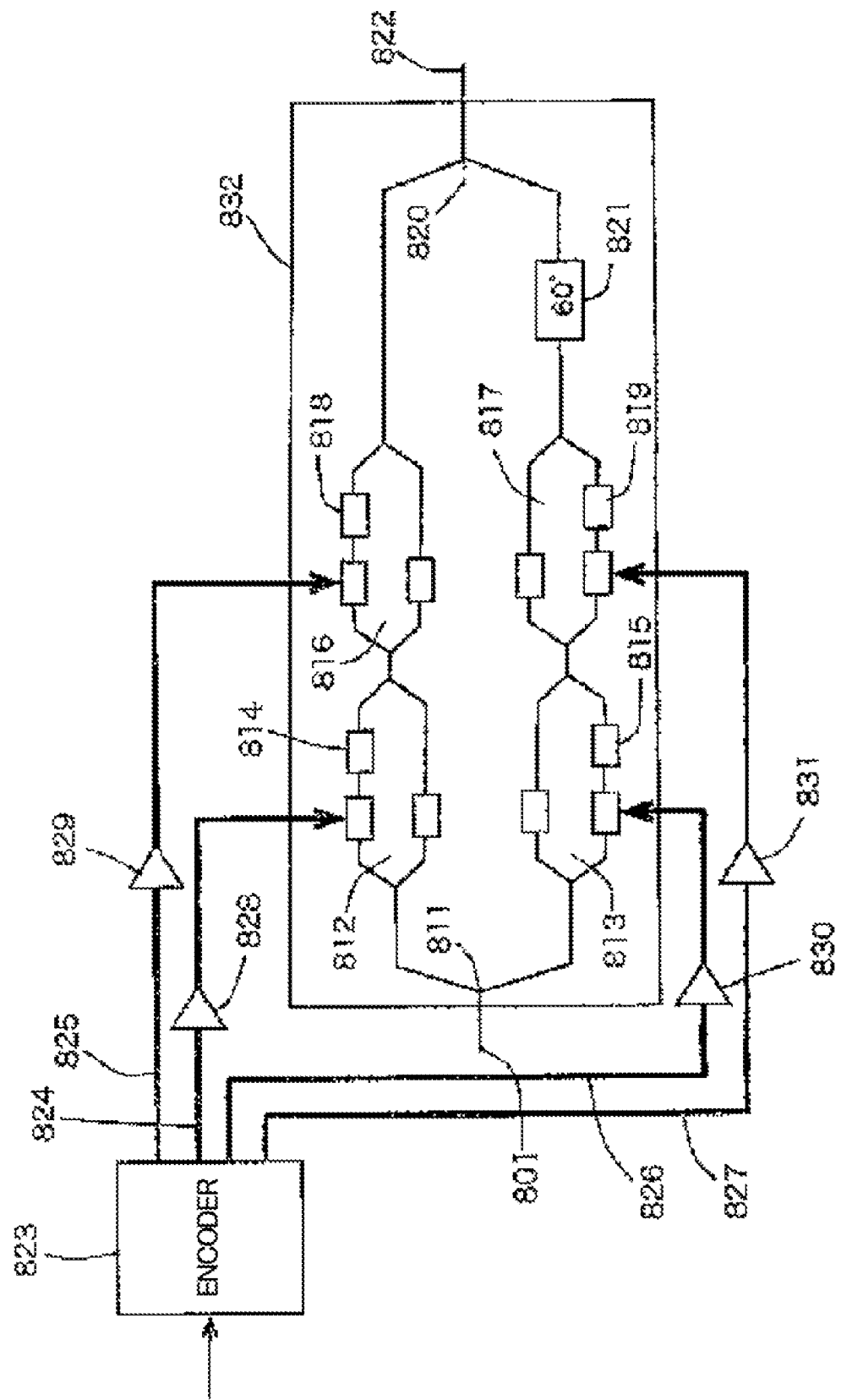
FIG. 8 is a block diagram of the optical modulator according to Embodiment 3 of the present invention.

FIG. 8 is a block diagram of the optical modulator according to Embodiment 3 of the present invention. In the optical modulator shown in FIG. 8, the Mach-Zehnder modulators are driven by binary electric signals in order to generate six-level phase-modulated signals. An encoder 823 transforms input data to four series of binary signals and outputs them. Light entering from an incident fiber 801 is divided into two lights of the same amount by an optical branching unit 811. The first signal light enters a first Mach-Zehnder modulator 812 and is modulated by the first Mach-Zehnder modulator 812. The first Mach-Zehnder modulator 812 receives, as a drive signal, a first output (binary signal) 824 from the encoder 823 after it is amplified by a driver amplifier 828 to make a peak-to-peak amplitude $2V\pi$. The drive signal has two voltage levels $-V\pi$ and $V\pi$.

A voltage that leads to the quenching when the drive signal is 0, namely the voltage Vb shown in FIG. 4 is applied to a DC bias port 814. Consequently, the first Mach-Zehnder modulator 812 yields signal light in either one of the following states, emission in a phase of 0 and emission in a phase of it. A third Mach-Zehnder modulator 816 modulates the intensity of the output light from the first Mach-Zehnder modulator 812.

The third Mach-Zehnder modulator 816 receives a third output (binary signal) 825 from the encoder 823 after it is amplified by a driver amplifier 829 to make a peak-to-peak amplitude Vπ. Here, a proper voltage is applied to a DC bias port 818 so that light is totally transmitted or shielded depending on the two input levels to the third Mach-Zehnder modulator 816. The combination of the phase modulation by the first Mach-Zehnder modulator 812 and the intensity modulation by the third Mach-Zehnder modulator 816 yields light in the three states including emission in a phase of 0, quenching, and emission in a phase of π, which are output from the first Mach-Zehnder modulator 512 in Embodiment 1 shown in FIG. 5.

The second signal light from the optical branching unit 811 enters a second Mach-Zehnder modulator 813 and is modulated by the second Mach-Zehnder modulator 813. The second Mach-Zehnder modulator 813 receives, as a drive signal, a second output (binary signal) 826 from the encoder 823 after it is amplified by a driver amplifier 830 to make a peak-to-peak amplitude 2Vπ.

A proper voltage that leads to the quenching when the drive signal is 0, namely the voltage Vb shown in FIG. 4 is applied to a DC bias port 815. Consequently, the second Mach-Zehnder modulator 813 yields signal light in either one of the following states, emission in a phase of 0 and emission in a phase of π. A fourth Mach-Zehnder modulator 817 modulates the intensity of the output light from the second Mach-Zehnder modulator 813.

A proper voltage that leads to the quenching when the drive signal is 0, namely the voltage Vb shown in FIG. 4 is applied to a DC bias port 815. Consequently, the second Mach-Zehnder modulator 813 yields signal light in either one of the following states, emission in a phase of 0 and emission in a phase of π. A fourth Mach-Zehnder modulator 817 modulates the intensity of the output light from the second Mach-Zehnder modulator 813.

The fourth Mach-Zehnder modulator 817 receives a fourth output (binary signal) 827 from the encoder 823 after it is amplified by a driver amplifier 831 to make a peak-to-peak amplitude Vπ. A proper voltage is applied to a DC bias port 819 so that light is totally transmitted or shielded depending on the two input levels to the fourth Mach-Zehnder modulator 817. The combination of the phase modulation by the second Mach-Zehnder modulator 813 and the intensity modulation by the fourth Mach-Zehnder modulator 817 yields light in the three states including emission in a phase of 0, quenching, and emission in a phase of π. A phase shifter 821 gives a phase difference of 60° to the output light from the fourth Mach-Zehnder modulator 817.

An optical multiplexer 820 multiplexes the output light from the third Mach-Zehnder modulator 816 and the output light from the phase shifter 821 and outputs the resultant light. The output of the optical multiplexer 820 is coupled to an output fiber 822 via a waveguide of a lithium niobate crystal substrate 832 and output to the output fiber 822. The signals output from the encoder 823 and applied to the first, second, third, and fourth Mach-Zehnder modulators 812, 813, 816, and 817 can be those as shown in FIG. 9. In this embodiment, the signals driving the optical modulators are all binary signals and six-level phase-modulated light is generated.

In FIG. 9, "Output 1 (PM-1)" and "Output 2 (AM-1)" correspond to the first output 824 given to the first Mach-Zehnder modulator 812 from the encoder 823 and the first output 825 given to the third Mach-Zehnder modulator 816 from the encoder 823, respectively. "Output 3 (PM-2)" and "Output 4 (AM-2)" correspond to the second output 826 given to the second Mach-Zehnder modulator 813 from the encoder 823 and the fourth output 827 given to the fourth Mach-Zehnder modulator 817 from the encoder 823, respectively. Additionally, "*" in FIG. 9 indicates that any of the three values is available.

In this embodiment, the third and fourth Mach-Zehnder modulators 813 and 817 are used. However, Mach-Zehnder modulators are not necessarily utilized as long as the intensity modulation is conducted. For example, the third and fourth Mach-Zehnder modulators 813 and 817 can be replaced with electric field absorption optical modulators or optical modulators using the acoustooptic effect. The same effect as in this embodiment can be obtained even if the order of phase modulation and intensity modulation is reversed from that in FIG. 8. The symbol assignment shown in FIG. 9 is given by way of example and other symbol assignments can be used.

Embodiment 4

Figure 10:
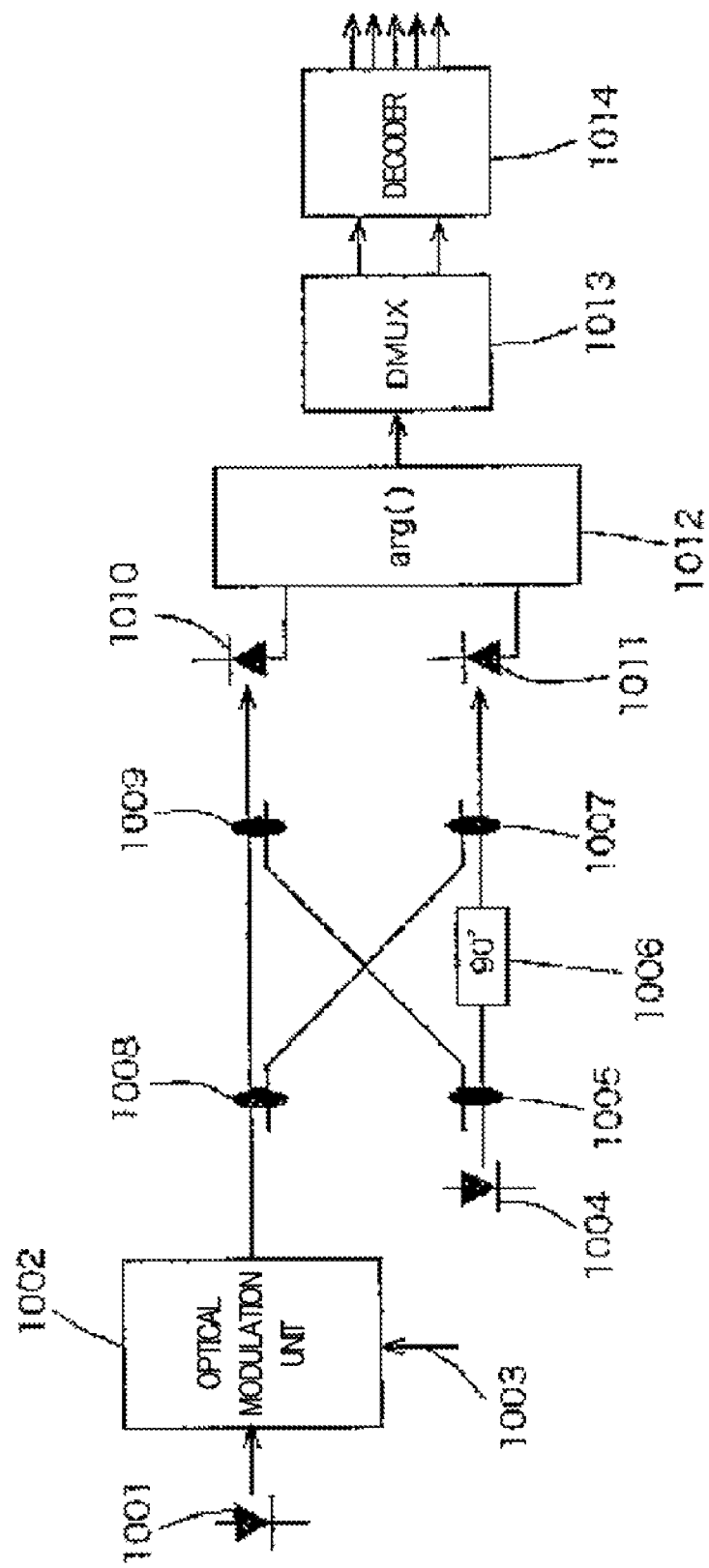
FIG. 10 is a block diagram of the optical communication system according to Embodiment 4 of the present invention.
Figure 11:
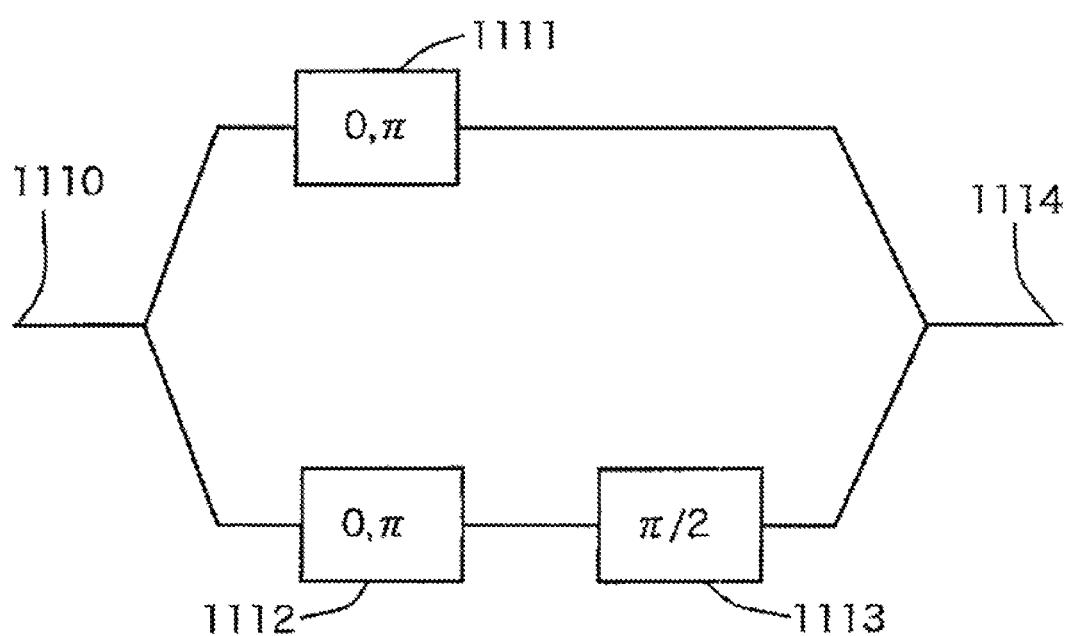
FIG. 11 is a block diagram showing a quadrature phase shift keying unit.
Figure 12:
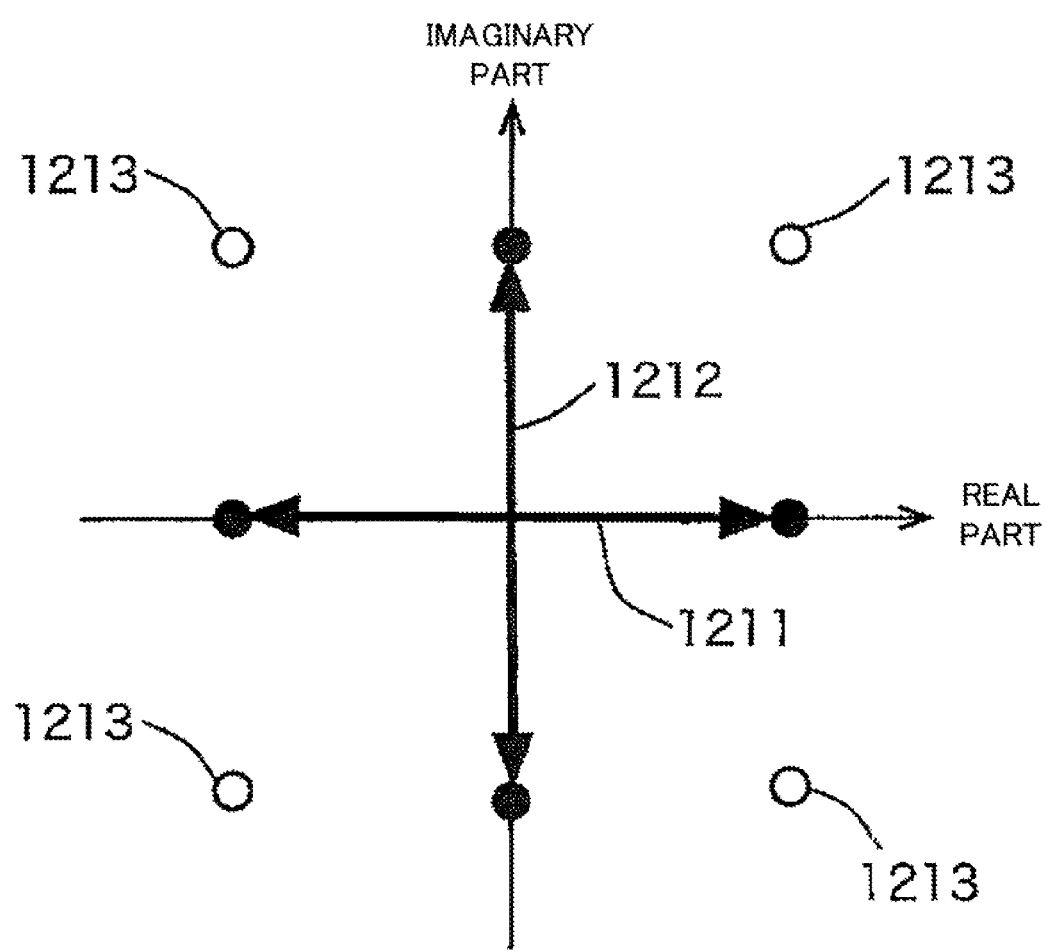
FIG. 12 presents a plane of complex coordinates showing the phases of four-level phase-modulated light.
Figure 13:
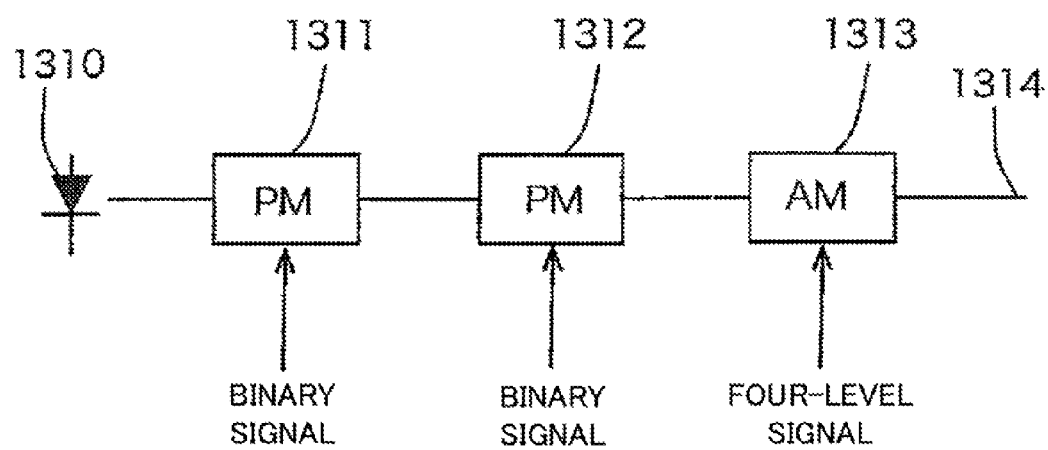
FIG. 13 is a block diagram of the multi-level modulated signal generation part of the optical communication system shown in FIG. 8.
Figure 14:
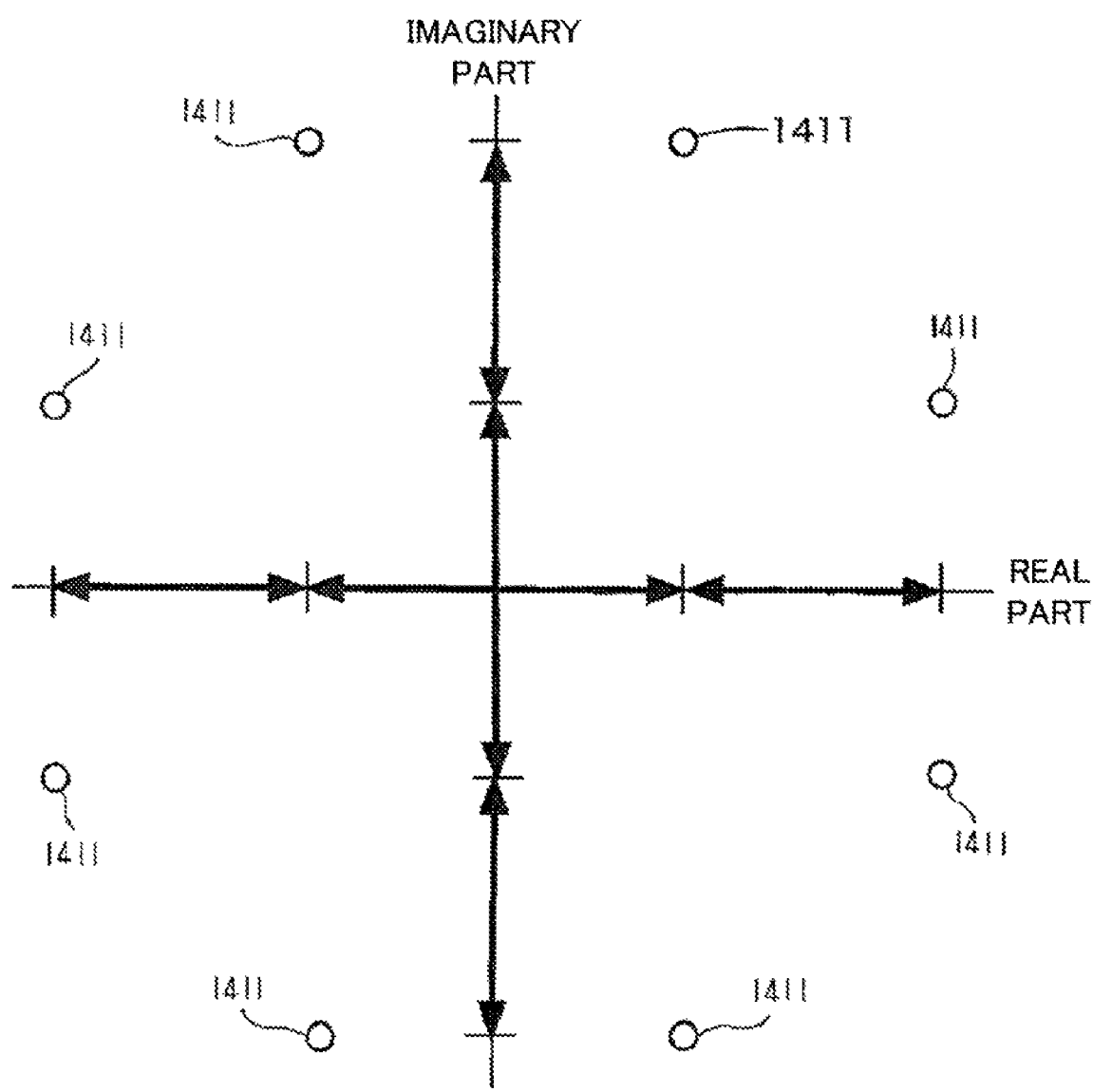
FIG. 14 presents a plane of complex coordinates showing the phases of eight-level phase-modulated signals.

FIG. 10 is a block diagram of the optical communication system according to Embodiment 4 of the present invention. The optical communication system shown in FIG. 10 includes an optical modulator 1002 according to an embodiment of the present invention and a reception part of a coherent detection system (a reception part conducting coherent reception).

In the optical communication system shown in FIG. 10, the optical modulation unit 1002 modulates light from a monochromatic wavelength light source 1001 based on input binary data 1003 to generate six-level phase-modulated light. The optical modulation unit 1002 has the same configuration as shown in FIG. 5 or FIG. 8. The light from the optical modulation unit 1002 is branched by an optical splitter 1008 in the reception part. The reception part further comprises a local light source 1004. Light from the local light source 1004 is branched into two local lights by an optical splitter 1005. One local light is given a phase shift of 90° by an optical phase shifter 1006. An optical coupler 1009 mixes one signal light from the optical splitter 1008 and one local light from the optical splitter 1005 and outputs the mixed light to an optical detector 1010. The optical detector 1010 transforms the signal light from the optical coupler 1009 to electric signals.

Similarly, an optical coupler 1007 mixes the other signal light from the optical splitter 1008 and the other local light from the optical phase shifter 1006 and outputs the mixed light to an optical detector 1011. The optical detector 1011 transforms the signal light from the optical coupler 1007 to electric signals. The two lights entering the optical detectors 1010 and 1011 become signals presenting the sin θ component and cos θ component of the signal light (θ is an optical phase). A phase detector 1012 detects the θ from the two electric signals and identifies the state of the received signal among the six states. The six-level signals identified and output by the phase detector 1012 are separated into two symbols by a 1:2 separator circuit 1013. A decoder 1014 restores 5-bit information from the symbols separated by the 1:2 separator circuit 1013 and outputs the 5-bit information. In this way, the original data is restored from the received six-level signal light.

In this embodiment, the local light and signal light are phase-synchronized. Phase-synchronization methods are known to a person of ordinary skill in the field. Alternatively, phase estimation by phase diversity techniques can be adopted. Original data can be restored from received six-level signal light by heterodyne reception in which the local light and signal light are received with their phase and frequency shifted. Heterodyne reception methods are also known to a person of ordinary skill in the field.

The present invention is specified and described using exemplary embodiments. The present invention is not restricted to these embodiments and their modifications. As apparent to a person of ordinary skill in the field, various modifications can be made to the present invention without departing from the spirit and scope of the present invention defined in the attached claims.

The invention claimed is:

1. An optical modulator comprising:
an optical branching unit branching incident light into a first signal light and a second signal light;
a first Mach-Zehnder modulator modulating said first signal light;
a second Mach-Zehnder modulator modulating said second signal light;
a phase shifter giving a fixed phase shift to the phase of the output light from said second Mach-Zehnder modulator; and
an optical multiplexer multiplexing the output light from said first Mach-Zehnder modulator and the output light from said phase shifter, wherein
said phase shifter gives said phase shift so that the two input lights to said optical multiplexer have a phase difference of 60 degrees; and
said first and second Mach-Zehnder modulators are driven by three-level signals.

2. The optical modulator according to claim 1 wherein the time average value of said three-level signals is 0.

3. The optical modulator according to claim 1 wherein an encoder generating three-level signals is provided and said encoder generates, from 5-bit input data, two series of three-level signals in two symbols supplied to the first and second Mach-Zehnder modulators and outputs them.

4. The optical modulator according to claim 3 wherein the average value of all three-level signals corresponding to 5-bit input data is 0.

5. An optical modulator comprising:
an optical branching unit branching incident light into a first signal light and a second signal light;
a first phase modulator modulating said first signal light;
a second phase modulator modulating said second signal light;
a first intensity modulator modulating the intensity of the output light from said first phase modulator;
a second intensity modulator modulating the intensity of the output light from said second phase modulator;
a phase shifter giving a fixed phase shift to the phase of the output light from said second intensity modulator; and
an optical multiplexer multiplexing the output light from said first intensity modulator and the output light from said phase shifter, wherein
said phase shifter gives said phase shift so that the two input lights to said optical multiplexer have a phase difference of 60 degrees; and
said first and second phase modulators and first and second intensity modulators are driven by binary signals.

6. An optical communication system comprising:
an encoder circuit transforming input data to two series of three-level signals and outputting them;
an optical branching unit branching incident light into a first signal light and a second signal light;
a first Mach-Zehnder modulator modulating said first signal light;
a second Mach-Zehnder modulator modulating said second signal light;
a phase shifter giving a fixed phase shift to the phase of the output light from said second Mach-Zehnder modulator;
an optical multiplexer multiplexing the output light from said first Mach-Zehnder modulator and the output light from said phase shifter;
a reception means for receiving the output light from said optical multiplexer and performing coherent reception with a local light;
a phase detection means for detecting the optical phase of the output signal light from said reception means; and
a decoder circuit outputting binary data based on the output from said phase detection means, wherein
said phase shifter gives said phase shift so that the two input lights to said optical multiplexer have a phase difference of 60 degrees; and
said first and second Mach-Zehnder modulators are driven by three-level signals output from said encoder circuit.

7. An optical communication system comprising:
an encoder circuit transforming input data to four series of binary signals and outputting them;
an optical branching unit branching incident light into a first signal light and a second signal light;
a first phase modulator modulating said first signal light;
a second phase modulator modulating said second signal light;
a first intensity modulator modulating the intensity of the output light from said first phase modulator;
a second intensity modulator modulating the intensity of the output light from said second phase modulator;
a phase shifter giving a fixed phase shift to the phase of the output light from said second intensity modulator;
an optical multiplexer multiplexing the output light from said first intensity modulator and the output light from said phase shifter;
a reception means for receiving the output light from said optical multiplexer and performing coherent reception with a local light;
a phase detection means for detecting the phase of the output light from said reception means; and
a decoder circuit outputting binary data based on the output from said phase detection means, wherein
said phase shifter gives said phase shift so that the two input lights to said optical multiplexer have a phase difference of 60 degrees; and
said first and second phase modulators and said first and second intensity modulators are driven by binary signals output from said encoder circuit.

* * * * *